United States Patent [19]
Fujiwara et al.

[11] Patent Number: 5,323,715
[45] Date of Patent: Jun. 28, 1994

[54] APPARATUS FOR TREATING WASTE OIL

[75] Inventors: Hideyoshi Fujiwara; Naomi Ishikawa, both of Tokyo, Japan

[73] Assignee: Create Ishikawa Co., Ltd., Japan

[21] Appl. No.: 43,851

[22] Filed: Apr. 7, 1993

[30] Foreign Application Priority Data

Apr. 9, 1992 [JP] Japan .................. 4-115295

[51] Int. Cl.$^5$ .............................................. F23G 7/04
[52] U.S. Cl. ..................... 110/238; 110/224; 110/262; 110/342
[58] Field of Search .............. 110/238, 224, 262, 342

[56] References Cited

U.S. PATENT DOCUMENTS

| | | | |
|---|---|---|---|
| 4,579,069 | 4/1986 | Gray et al. | 110/238 |
| 4,949,655 | 8/1990 | Greer et al. | 110/238 |
| 5,245,937 | 9/1993 | Nakase et al. | 110/238 |

FOREIGN PATENT DOCUMENTS 48-73830 10/1973 Japan.
51-76179 6/1976 Japan.
52-383 1/1977 Japan.

Primary Examiner—Henry C. Yuen
Attorney, Agent, or Firm—Ronald P. Kananen

[57] ABSTRACT

In an apparatus for burning a combustible liquid containing a combustible liquid and water, a furnace (1) has a lower portion, an upper portion and a side portion extending between the lower portion and the upper portion. A burner (2) is placed at the lower portion of the furnace (1) for burning a fuel. A heat exchanger (3A) is connected to the furnace (1) for receiving a hot gas produced in the furnace (1) and heating the combustible liquid so as to vapourize the water. A generator (3B) is connected to the heat exchanger (3A) for generating the vapourized water. A heater (7) is placed at the upper portion of the furnace (1) and connected to the generator (3B) for heating the vapourized water so as to be dried before it enters into the furnace (1).

17 Claims, 2 Drawing Sheets

APPARATUS FOR TREATING WASTE OIL

BACKGROUND OF THE INVENTION

The present invention relates to an apparatus for treating various waste oils and in particular to an apparatus for treating various waste oils containing a large percentage of water.

One of the recent worldwide problems is environmental pollution particularly in rivers and seas. Waste oils often pollute the rivers and seas. Such waste oils are produced in various places, for example, as waste liquids from houses in daily life and ships. The waste oils are apt to contain a lot of water.

Japanese Patent Unexamined Publication No. 48-73830, Japanese Utility Model Unexamined Publication No. 51-76179 and Japanese Utility Model Examined Publication No. 52-383 disclose that waste oils are first separated from water and then treated by burning. In the prior art apparatuses disclosed in such documents, waste oil mixed with water is fed into a water-oil separation means where water is separated from oil due to different specific gravities thereof after heated.

However, any waste oil containing a large percentage of water cannot be burned before they are separated from each other according to the prior art apparatuses. In order that a lot of waste oil mixed with water is treated to 5 ppm, for instance, a large sized oil-water separation apparatus must be used to separate the oil from the water. Therefore, treatment efficiency is low. For example, it is difficult to separate the oil from the water to such a degree that the water can be discharged, in particular in case of emulsion oil. Also, treatment costs are high.

On the other hand, waste oil containing a small percentage of water can be burned, but smell and/or smoke problems take place as secondary pollutions, particulary in case of heavy oil C or pilge oil.

SUMMARY OF THE INVENTION

The object of the present invention is to provide an apparatus for treating waste oils containing a large percentage of water at a high efficiency.

According to the present invention, an apparatus for treating a combustible liquid containing a combustible liquid and water comprises a furnace, a burner placed at the furnace for burning a fuel, a heat exchanger connected to the furnace for receiving a hot gas or exhaust gas produced in the furnace and heating the combustible liquid so as to vapourize the water, a generator connected to the heat exchanger for generating the vapourized water, a first heater placed at the furnace and connected to the generator for heating the vapourized water so as to be dried before it enters into the furnace whereby the combustible liquid mixed with the vapourized water can be burned in the furnace.

In a preferred mode of the present invention, the generator includes an intake port formed in a side wall portion of the generator at a predetermined level so as to intake the combustible liquid. The heat exchanger is connected via a hot gas channel or exhaust gas line to the furnace, and a preheating chamber is formed at the hot gas channel for preheating air to be fed into the burner. The burner includes a burner body and a nozzle placed in the burner body so as to form a clearance between the burner body and the nozzle in such a manner that a fuel in the nozzle is sucked when the air flows through the clearance into the burner body. An air conduit is connected with the preheating chamber with the burner. A blower is placed in an intermediate portion of the air conduit for blowing the air into the burner. A first tank contains the fuel, to which the nozzle is connected so that the fuel can be fed from the first tank into the nozzle. A second tank contains the combustible liquid, to which the heat exchanger is connected so that the combustible liquid can be fed from the second tank into the heat exchanger.

The generator includes an intake port formed in a side wall portion of the generator at a predetermined level so as to intake the combustible liquid, and the intake port is connected to the first tank so that the combustible liquid in the generator can be fed into the first tank.

In a further mode of the present invention, the apparatus includes means for intaking selectively the combustible liquid in the generator and feeding it into the burner.

In another mode of the present invention, the first heater is heated by the burner within the furnace. The burner includes a cylindrical burner body and a nozzle placed in the burner body and having a funnel-shaped tip portion so as to form a clearance between the burner body and the nozzle in such a manner that the fuel in the nozzle is atomized when the air flows through the clearance into the furnace. The first heater has openings for jetting the vapourized water with the combustible liquid into the furnace. A second heater is provided to heat the fuel in the first tank. The hot gas channel is formed in the shape of a funnel having a large diameter end portion joined to the heat exchanger and a small-diameter end portion joined to the furnace.

In another mode of the present invention, the three steps of heating, vapourizing and burning are completely closed in the treating apparatus so that the oil can be burned without discharging thereof into the atmosphere. The heat energy produced during the steps is utilized so as to separate the oil from the water. Thus, the separated oil or condensed oil containing a small percentage of water, for instance, 30 percent by weight or less, is used as a fuel which is burned at the burner. Therefore, both waste oils containing a small percentage of water and waste oils containing a large percentage of water can be treated. The steam or vapourized water produced in the generator is fed into the furnace and then discharged out of the apparatus so as to avoid pollution of oil smell.

In case a burner has a special structure so as to suck the fuel in a nozzle when it enters into a furnace, it is not necessary to forcedly pump the fuel under high pressure into the nozzle so as to jet the fuel into the furnace. The fuel is effectively atomized at the nozzle whereby it can be perfectly burned.

Because the first heater heats the vapourized water with the oil before it enters into the furnace, the oil can be perfectively burned without smell and smoke. Thus produced hot gas or exhaust gas is fed into the heat exchanger for heating the waste oil containing a large percentage of water, for example, more than 90%. As a result, the water is vapourized in the generator joined to the heat exchanger so as to produce a hot steam with oil whereby it can be easily burned.

According to the best mode of the present invention, waste oils can be perfectly treated so that any part thereof is never discharged out of the apparatus. No pollution can be accomplished at a low cost. Even waste oils can be used as a fuel.

According to another mode of the present invention, an apparatus treats two kinds of waste oils, one of which contains a large percentage of water, for example, more than 90%, and the other of which contains a small quantity of water, for example, less than 30%. The latter is used as a fuel. A furnace has a lower portion, an upper portion and a side portion extending between the lower portion and the upper portion. A burner is placed at the lower portion of the furnace for burning the fuel. A heat exchanger is connected to the furnace for receiving heat from a hot gas produced in the furnace and heating the waste oil containing a lot of water so as to vapourize the water. A generator is connected to the heat exchanger for generating the vapourized water. A heater is placed at the upper portion of the furnace and connected to the generator for heating the vapourized water so as to be dried before it enters into the furnace.

DESCRIPTION OF THE EMBODIMENTS

Figure 1:
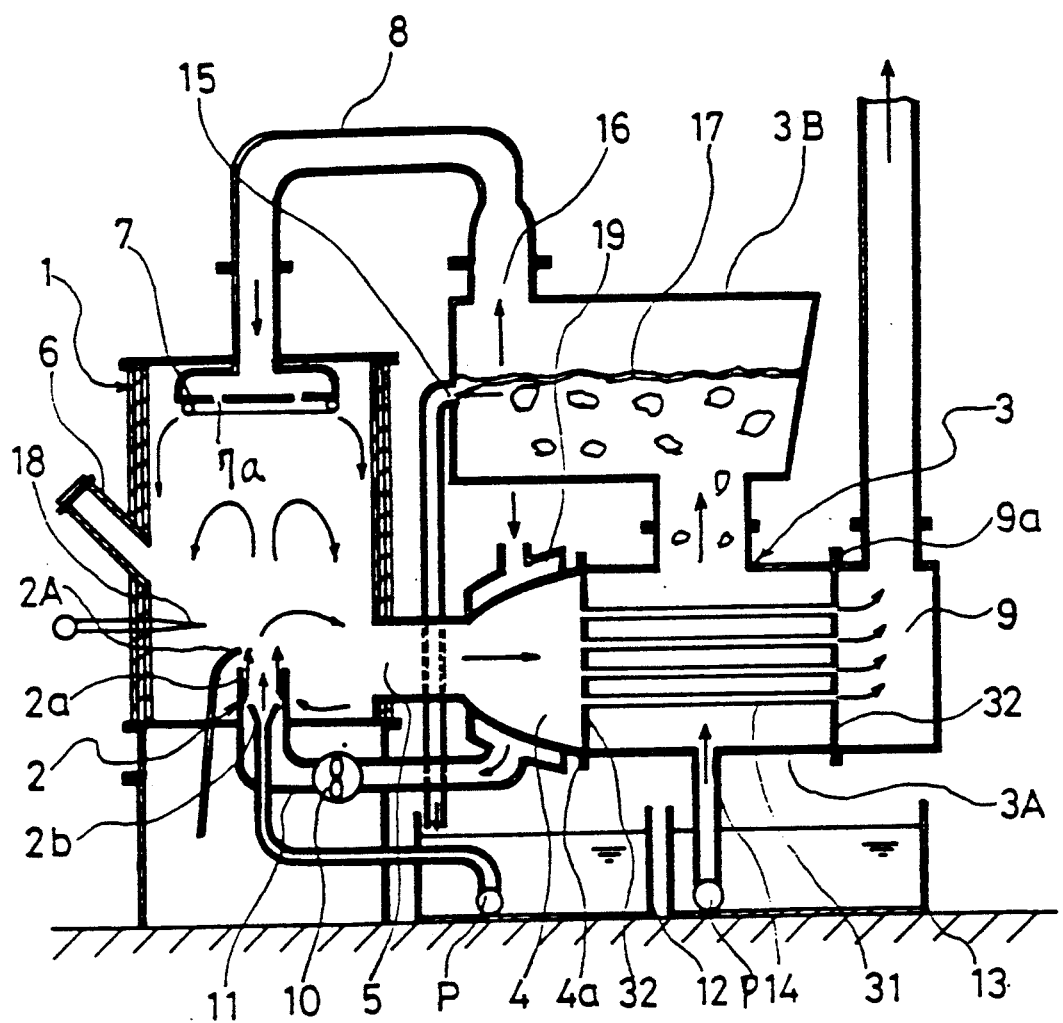
FIG. 1 is an apparatus for treating waste oil according to a preferred embodiment of the present invention.
Figure 2:
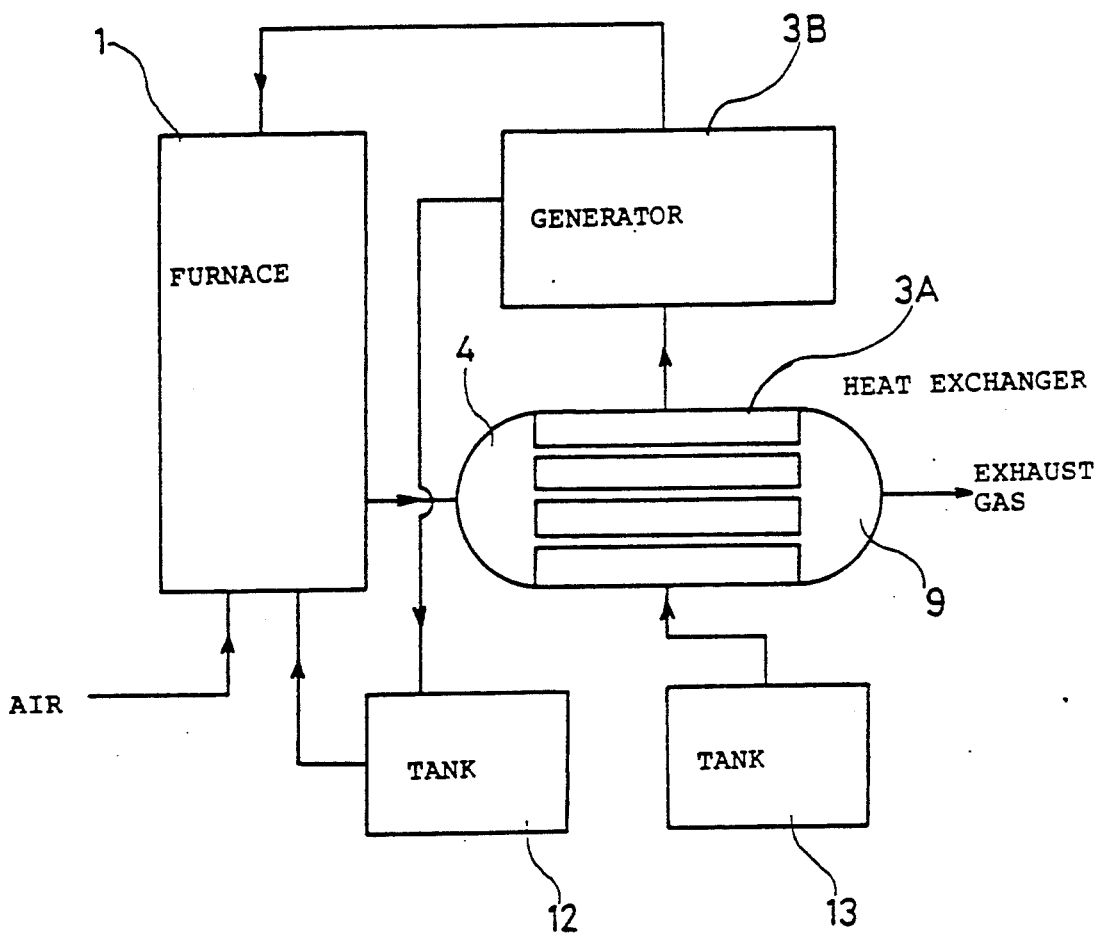
FIG. 2 is a flow chart showing a schematic burning system.

A treating apparatus includes a cylindrical combustion furnace 1, a burner 2 placed on a central portion of a base of the furnace 1, and a generating device 3 connected via a hot gas channel 4 to a lower side wall portion of the furnace 1 where a port 5 is formed. The generating device 3 includes a heat exchanger 3A and a generator 3B. An observing or inspection port 6 is formed at a side wall portion of the furnace 1 opposite to the hot gas port 5. A heater 7 is placed at an upper wall portion of the furnace 1.

The hot gas channel 4 is formed in the shape of a funnel and has a small-diameter end portion joined to the port 5 and a large-diameter end portion joined via a flange 4a to the heat exchanger 3A of the generating device 3. The heat exchanger 3A is connected to the generator 3B placed above the heat exchanger 3A. A top port 16 is formed in an upper wall of the generator 3B so as to send generated steam or vapourized water containing vapourized oil or the like into the heater 7 within the furnace 1. The port 16 of the generator 3B is connected via a conduit 8 to the heater 7.

The heat exchanger 3A includes a cylindrical casing, a plurality of heat exchanging tubes 31 extending therein in parallel to each other and fixed to an end plate 32, and an exhaust hood 9 positioned at an end thereof opposite to the hot gas channel 4. The exhaust hood 9 is joined via a flange 9a to the right end of the tubes 31. The exhaust hood 9 is connected to a funnel through a proper cleaning means, if desired, before the exhaust gas is discharged out of the apparatus.

The burner 2 includes a cylindrical body 2a and a nozzle 2b arranged therein. The burner body 2a is joined to an air supply tube 11. A blower 10 is placed in an intermediate portion of the air supply tube 11. The nozzle 2b is formed in the shape of a funnel and connected via an oil conduit to an oil pump P. The burner body 2a and the nozzle 2b are arranged so as to form a fuel flow according to Bernoulli's theorem. A clearance between the inner wall of the burner body 2a and the outer end of the nozzle 2b is set to be small so as to function as an atomizer so that an atomized fuel with a high pressure is produced at a high speed whereby the fuel can be easily burned. As the air is supplied at a high speed into the burner body 2a through the small clearance between the burner body 2a and the nozzle 2b, a space in the tip portion of the nozzle 2b is slightly vacuumed so as to intake the fuel.

A ring type preheating chamber 19 is formed on the periphery of the hot gas channel 4 so as to preheat air before it is introduced into the air supply tube 11.

A tank 12 is placed below the hot gas channel 4 and contains fuel which is to be fed into the nozzle 2b by means of the pump P.

A further tank 13 is placed below the heat exchanger 3A and contains combustible liquid including a large percentage of water. Examples of the combustible liquid are waste oil, bilge, vegetable oil, paint and varnish, solvent toluol, mineral oil and others.

A riser 14 has a lower end connected via a pump P to the tank 13 at its bottom and an upper end joined to a lower portion of the heat exchanger 3A whereby the combustible liquid can be fed from the tank 13 into the heat exchanger 3A. The combustible liquid further moves upwards among the heat exchange tubes 31 through the heat exchanger 3A and then flows into the generator 3B in the direction of arrows.

An intake port 15 is formed in a side wall portion of the generator 3B at a predetermined level. The oil or the like flows into the intake port 15 because of its low specific gravity in comparison with the water and is then fed into the tank 12. A further tank can be provided so as to receive the oil or the like from the intake port 15 of the generator although not shown.

It is preferable that a heater (not shown) is placed at the container 12 so as to heat the fuel contained therein. In such a case, fuel oil C, lubricating oil or the like can be easily burned at the burner 2. Also, a heater can be provided in order to heat the combustible liquid in the tank 13.

In operation, a fuel is set in the tank 12 while the combustible liquid containing a lot of water such as waste oil is set in the tank 13. A motor (not shown) for the blower 10 is switched on. After the pump in the tank 12 starts, the burner 2 is ignited by an auxiliary or pilot burner 2A. An operator (not shown) observes through the inspection window 6 how it is producing a flame while he adjusts the flow rate of air which is fed into the cylindrical body 2a by means of the blower 10. The temperature in the furnace 1 is detected by a thermocouple 18 fixed to the side wall portion of the furnace 1 below the inspection window 6. The inner tip of the thermocouple 18 can be observed through the inspection window 6.

When a proper burning condition is maintained for a predetermined period of time, the temperature in the furnace 1 reaches up to a desired value. The hot gas or exhaust gas produced in the furnace 1 flows through the hot gas channel 4 into the heat exchange tubes or pipes 31 and then comes into the exhaust hood 9.

Next, the pump in the tank 13 starts so as to pump the combustible liquid containing a lot of water from the pump into the heat exchanger 3A. When the combustible liquid moves up and/or remains in the heat exchanger 3A, it receives heat from the hot gas via the heat exchange pipes 31. As a result, the combustible liquid is heated. When the water contained in the combustible liquid is heated near or to its boiling point, it is vapourized in the generator 3B so as to generate steam or vapourized water in the generator. The vapourized water or steam moves up through an uppermost oil layer 17 which is always positioned as a top layer because of its low specific gravity. The steam with some oil and its smell is fed through the steam conduit 8 into the heater 7 in the furnace 1 while the heater 7 is heated by a flame produced by the burner 2. Thus, before the vapourized water enters into the furnace 1, it is heated by the heater 7 so as to be dried up. Thus dried steam mixed with some oil is jetted into the furnace 1 through small jet openings 7a formed in the heater 7 and then burned completely by the flame of the burner 2 when it flows down along the inner wall of the furnace 1. The exhaust gas is sent through the hot gas channel 4 and the heat exchange pipes 31 into the exhaust hood 9 and then discharged out of the apparatus after it is cleaned.

The air for fuel burning is supplied via the preheating chamber 19, the air conduit 11 and the air blower 10 into the burner 2. When the air flows via the clearance between the burner body 2a and the nozzle 2b into the interior of the burner body 2a, the funnel-shaped inner space of the nozzle 2b is vacuumed to some degree. Thus, even if the pumping force of the pump in the tank 12 is weak, the fuel can be atomized at the tip of the nozzle 2b.

Because the water in the heat exchanger 3a and the generator 3B is heated so as to be vapourized, the oil mixed with water is condensed in the generator 3B. Only oil or a combination of oil and very small water flows via the intake port 15 into the tank 12 whenever it reaches to a predetermined level.

An apparatus for burning waste oil according to the present invention can be installed not only on the ground but also on a boat, a ship, a vehicle or any other place.

EXAMPLE

A fuel oil in the tank 12 consisted of a first waste oil which was discharged from an engine cylinder and a second waste oil which was used fuel oil and contained about 30 percentage by weight. The ratio of the first waste oil to the second waste oil was 1:2.

A combustible liquid in the tank 13 was a bilge oil which was collected on the bottom of a ship in which the percentage of water content was 97 to 99 percentage by weight.

The fuel oil was heated to 140° C. in the tank 12 and then fed into the nozzle 2b by the pump. The temperature of the fuel oil at the nozzle 2b was 120° C. The temperature of air sent through the air conduit 11 by the blower 10 was 125° C. at the burner 2.

The temperature in the furnace 1 was increased up to 1,000° to 1,100° C. The fuel oil and the bilge oil were completely burned so as to produce substantially no smell or smoke. The temperature of the exhaust gas was 420° C. in the exhaust hood 9.

As a result of the above-stated burning operation, a vaporized rate of the combustible liquid was 60 liter/hr. when a burning rate of the fuel oil was 12 liter/hr.

What is claimed is:

1. An apparatus for treating a combustible liquid containing a combustible liquid and water, comprising:
   a furnace (1) having a lower portion, an upper portion and a side portion extending between the lower portion and the upper portion,
   a burner (2) placed at the lower portion of the furnace (1) for burning a fuel,
   a heat exchanger (3A) connected to the furnace (1) for receiving heat from a hot gas produced in the furnace (1) and heating the combustible liquid so as to vapourize the water,
   a generator (3B) connected to the heat exchanger (3A) for generating the vapourized water therein, and
   a first heater (7) placed at the upper portion of the furnace (1) and connected to the generator (3B) for heating the vapourized water so as to be dried before it enters into the furnace (1).

2. An apparatus as defined in claim 1, wherein the generator (3B) includes an intake port (15) formed in a side wall portion of the generator (3B) at a predetermined level so as to intake the combustible liquid.

3. An apparatus as defined in claim 1, wherein the heat exchanger (3A) is connected via a hot gas channel (4) to the furnace (1), and a preheating chamber (19) is formed at the hot gas channel (4) for preheating air to be fed into the burner (2).

4. An apparatus as defined in claim 1, wherein the burner (2) includes a burner body (2a) and a nozzle (2b) placed in the burner body (2a) so as to form a clearance between the burner body (2a) and the nozzle (2b) in such a manner that a space in the nozzle (2b) is vacuumed when the air flow through the clearance into the burner body (2a).

5. An apparatus as defined in claim 1, further comprising a hot gas channel (4) through which the heat exchanger (3A) is connected to the furnace (1), a preheating chamber (19) formed at the hot gas channel (4) for preheating air to be fed into the burner (2), an air conduit (11) connecting the preheating chamber (19) with the burner (2), a blower (10) placed in an intermediate portion of the air conduit (11) for blowing the air into the burner (2).

6. An apparatus as defined in claim 5, wherein the burner (2) includes a burner body (2a) joined to the air conduit (11) and a nozzle (2b) placed in the burner body (2a) so as to form a clearance between the burner body (2a) and the nozzle (2b) in such a manner that the fuel in the nozzle (2b) is sucked into the furnace (1) when the air flows through the clearance into the furnace (1).

7. An apparatus as defined in claim 6, further comprising a first tank (12) containing the fuel to which the nozzle (2b) is connected so that the fuel can be fed from the first tank (12) into the nozzle (2b), and a second tank (13) containing the combustible liquid to which the heat exchanger (3A) is connected so that the combustible liquid can be fed from the second tank (13) into the heat exchanger (3A).

8. An apparatus as defined in claim 7, wherein the generator (3B) includes an intake port (15) formed in a side wall portion of the generator (3B) at a predetermined level so as to intake the combustible liquid, and the intake port (15) is connected to the first tank (12) so that the combustible liquid in the generator (3B) can be fed into the first tank (12).

9. An apparatus as defined in claim 1, further comprising means (15) for intaking selectively the combustible liquid in the generator (3B) and feeding it into the burner (2).

10. An apparatus as defined in claim 1, wherein the first heater (7) is heated by the burner (2).

11. An apparatus as defined in claim 1, wherein the burner (2) includes a cylindrical burner body (2a) and a nozzle (2b) placed in the burner body (2a) and having a funnel-shaped tip portion so as to form a clearance between the burner body (2a) and the nozzle (2b) in such a manner that the fuel in the nozzle (2b) is atomized when the air flows through the clearance into the furnace (1).

12. An apparatus as defined in claim 1, wherein the first heater (7) has openings (7a) for jetting the vapourized water with the combustible liquid into the furnace (1).

13. An apparatus as defined in claim 7, further comprising a second heater for heating the fuel in the first tank (12).

14. An apparatus as defined in claim 5, wherein the hot gas channel (4) is formed in the shape of a funnel having a large-diameter end portion joined to the heat exchanger (3a) and a small-diameter end portion joined to the furnace (1).

15. An apparatus as defined in claim 1, further comprising:
   a first tank (12) for a fuel, to which the burner (2) is connected so that the fuel can be fed from the first tank (12) into the burner (2),
   a second tank (13) for a combustible liquid containing a large percentage of water, to which the heat exchanger (3A) is connected so that the combustible liquid can be fed from the second tank (13) into the heat exchanger (3A), and
   a means (15) for intaking selectively combustible liquid containing a small percentage of water from the generator (3B) and sending it into the first tank (12).

16. An apparatus as defined in claim 15, further comprising a second heater for heating the fuel in the first tank (12).

17. An apparatus as defined in claim 15, further comprising:
   a hot gas channel (4) through which the heat exchanger (3A) is connected to the furnace (1),
   a preheating chamber (19) formed at the hot gas channel (4) for preheating air to be fed into the burner (2),
   an air conduit (11) connecting the preheating chamber (19) with the burner (2), and
   a blower (10) placed in an intermediate portion of the air conduit (11) for blowing the air into the burner (2),
   wherein the burner (2) includes a burner body (2a) joined to the air conduit (11) and a nozzle (2b) placed in the burner body (2a) so as to form a clearance between the burner body (2a) and the nozzle (2b) in such a manner that the fuel in the nozzle (2b) is sucked into the furnace (1) when the air flows through the clearance into the furnace (1).

* * * * *